United States Patent [19]

Wutherich

[11] 4,408,830

[45] Oct. 11, 1983

[54] MULTIDIRECTIONAL TRANSLATOR MECHANISM

[75] Inventor: Hermann A. Wutherich, Rancho Palos Verdes, Calif.

[73] Assignee: The United States of America as represented by the Secretary of the Navy, Washington, D.C.

[21] Appl. No.: 239,717

[22] Filed: Mar. 2, 1981

[51] Int. Cl.³ .............................................. G02B 7/02
[52] U.S. Cl. ................................... 350/247; 33/1 M; 33/174 TA; 350/252
[58] Field of Search ............ 350/247, 10, 86, 115–116, 350/304; 356/252, 244; 108/143; 33/1 D, 1 M, 174 TA; 248/187, 274, 668

[56] References Cited

U.S. PATENT DOCUMENTS

| 802,394 | 10/1905 | Hill | 248/668 |
|---|---|---|---|
| 3,964,168 | 6/1976 | Uchida et al. | 33/1 M |
| 4,188,119 | 2/1980 | Schenck et al. | 356/252 |

FOREIGN PATENT DOCUMENTS 1087367  9/1958  Fed. Rep. of Germany ........ 350/86

Primary Examiner—William H. Punter
Attorney, Agent, or Firm—R. S. Sciascia; A. L. Branning; J. C. LaPrade

[57] ABSTRACT

The invention is a planar x-y translator for precision alignment of one part relative to another comprising a mounting plate holder, an adjustable cradle and a housing wherein the cradle is spring biased within the housing by multiple spring means at the top of the cradle and tension means at the base of the cradle.

5 Claims, 8 Drawing Figures

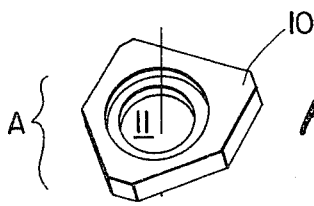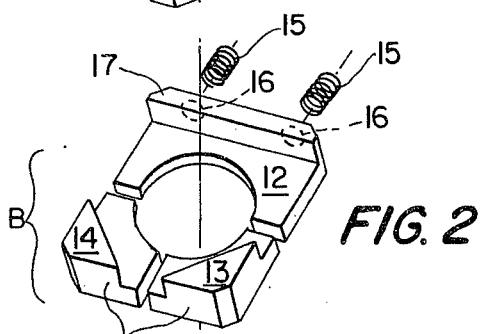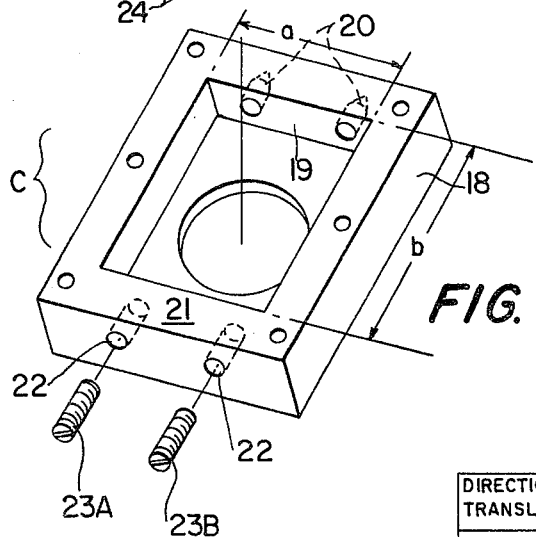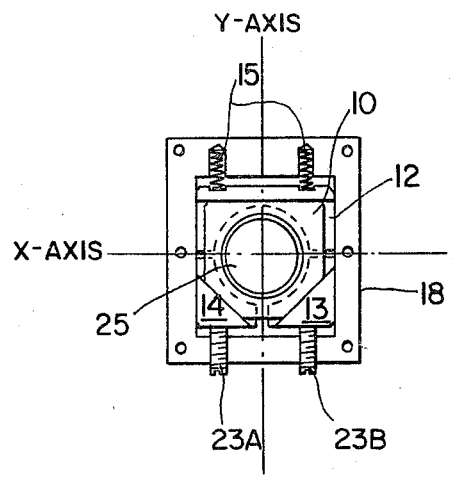

MULTIDIRECTIONAL TRANSLATOR MECHANISM

BACKGROUND OF THE INVENTION

In the development of the Navy Pointer Tracker involving the beam pointing system for the Navy ARPA laser, it was required that an integrated source/sensor designated input beam alignment sensor (IBAS) be designed and utilized in the laser tracking system. It was the function of the input beam alignment sensor to maintain the angular and translational alignment of the optical path between the laser and the beam pointer. The servo loop consists of this IBAS, two double axis steering mechanisms, the servo electronics and a passive reference unit on the laser.

The IBAS looks back approximately ten (10) meters from its position on the optical bench of the Navy Pointer Tracker toward the laser with the help of its own visible He Ne laser which is the source. This He Ne beam runs parallel with the laser beam and is reflected from a mirror fastened to the laser. The returning beam re-enters the IBAS on the same optical center line at the outgoing beam. Within the IBAS housing, the returning beam deviates and splits into two paths. One path leads to the angle sensing detector, the other beam to the translation sensing detector. The resulting electrical signals are used to control the steering mirrors and with their help keep the laser beam on the optical path. Any optical apparatus must be optically aligned after assembly due to manufacturing tolerances on all machined mechanical parts as well as optical elements. The course alignment of the optical elements is achieved by the mechanical holding devices. In the case of the IBAS, the end of the optical paths are the two detector elements which, after focusing in their optical axis, needed a full in plane, two degree of freedom translation to bring the center of the detective surfaces accurately into the center of their appropriate laser beam. In another application, the optical element could be a reticle moved relative to the beam, or to the before undetermined pick-sensitive area of a detective element. A common apparatus used in the prior art is two orthogonal sliding elements stacked together supporting the part to be aligned. On IBAS, height was a problem as well as manipulation of the multiple slides at 90° to each other. Access was from one side only. To move one sliding part A in a Y-axis motion is simple with the help of a screw pushing the slide along the Y axis. For O-backlash reasons, it may be necessary to force the slide back to the screw with a spring, so that a push-pull action can be produced. To move the slide in the X-axis, for instance, 90° to the Y-axis and operated from the same side as the Y-axis is manipulated, one could shift the slide with the help of a 90° knee lever, but the slide would need another orthogonal face to slide along, or instability would result.

The instant invention solves these problems and provides new and unexpected results.

SUMMARY OF THE INVENTION

The invention comprises a planar x-y translator yielding improved results.

It is one object of the invention to provide a translator that can be adjusted in both the X and Y planes by adjusting two screws on one side only.

It is another object of the invention to provide a simple and inexpensive translator that allows precise adjustments.

It is one object of the invention to provide a translator with limited height requirement that will fit into a small space.

Other objects of the invention will be apparent to those skilled in the art from a study of the drawings.

BRIEF DESCRIPTION OF THE DRAWINGS

FIG. 1 is a perspective view of the mounting plate holder of this invention.

FIG. 2 is a perspective view of the adjustable cradle of this invention.

FIG. 3 is a perspective view of the housing with adjustment screws.

FIG. 4 is an assembly drawing of the basic elements of this invention.

FIG. 5 is a operating diagramatic view.

DETAILED DESCRIPTION OF THE PREFERRED EMBODIMENTS

Figure 6:
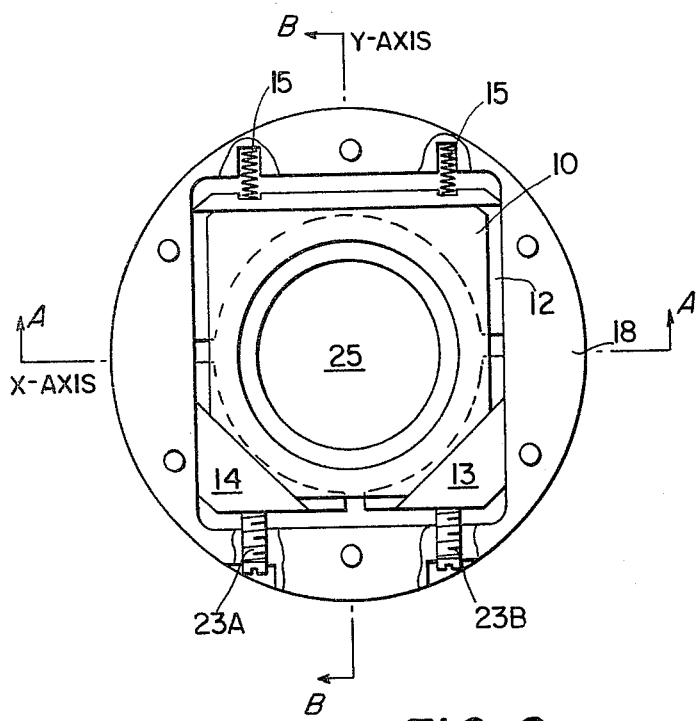
FIG. 6 is a plan view of the assembled elements of the invention.

FIG. 1 is a perspective view where part A comprises a mounting plate 10 that holds a detector or other optical element in cavity 11. This optical element requires alignment to a fixed part or alignment to a beam, for example, a laser beam.

In FIG. 2 the adjustable cradle element, that may be denominated part B, is split into three (3) sections 12, 13 and 14. The splitting of part B is along the x-y axis so as to fully allow for adjustment along both the x axis and y axis.

Mounting plate 10 fits into the opening machined in part B. The opening machined in part B is essential congruent to the exterior shape of part A.

A pair of springs 15 fit into openings 16 in the face 17 of cradle member 12.

In FIG. 3 housing 18, that is called part C, has an interior upper wall 19 with two openings 20 that are designed to accommodate springs 15.

The lower wall of the housing 21 has two openings 22 that are fitted with female screw threads. Screws 23 are screwed into the thread openings 22 and project into the interior of the housing 18. The projecting ends of the screws 23, in the utilization of the invention, bring pressure to bear upon the lower faces 24 of split segments 13 and 14, best illustrated in FIG. 2.

In FIG. 4, an assembly drawing illustrates the housing 18, the cradle elements 12, 13 and 14 between the screws 23 and the springs.

In FIG. 5 a chart is illustrated that indicates the direction of turn, that each screw left and right is to be turned in order to move plate 10 with the optical element 25 in a predetermined direction. The direction of the movement of the holder can readily ascertained and determined from a study of the chart in FIG. 5.

In FIG. 6, the housing 18 is circular instead of rectangular. The other elements correspond in number to those shown in FIG. 1 through FIG. 3.

Figure 7:
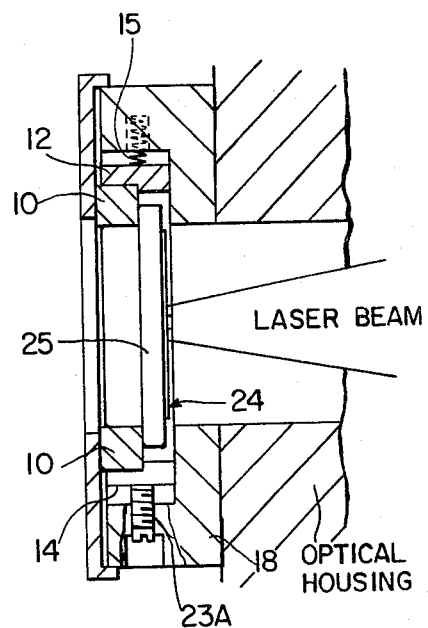
FIG. 7 is a sectional view taken along line B—B of FIG. 6.

In FIG. 7 a sectional view taken along line B—B of FIG. 6. The sensitive surface 24 of detector 25 is on the laser beam side of the translator. The other elements correspond in number to those shown in FIGS. 1–4.

Figure 8:
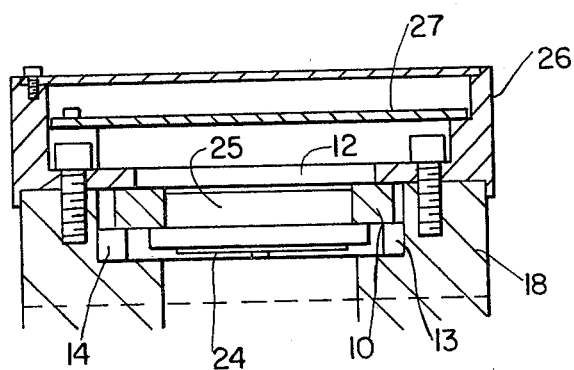
FIG. 8 is a sectional view along line A—A of FIG. 6.

In FIG. 8, a sectional view taken along line A—A of FIG. 6 showing a cover 26 with a pre-amp 27 are the only additions.

OPERATION OF THE INVENTION

In the operation of the invention, the translator is operated by moving the detector mounting holder 10 on an inclined face 14. Then when moved, the detector would move axially as well as in translation dependent on the angle of incline. Now if we take one other, with an inopposition leading inclined face 13 and if the angle of these faces is 45° relative to the push-pull axis and the detector mounting holder A 10 has a 90° pointed edge side which fits into the wedge shaped two 45° inclined sliding faces 14 and 13, one can move the detector holder in push-pull, that is forward backward by pushing with 2 screws evenly the same amount, and rotating one only, it moves the detector lateral over the 45° incline. When the screws are then rotated in opposite direction, the 45° inclined faces make a differential motion that gives the detector lateral motion only. To prevent rotation and to make the system O-backlash, a third sliding plate 12 is needed with a shoulder face 45° from either inclined faceplate and perpendicular to the adjusting screws. This will prevent the detector plate from rotating. With all 3 sliding sections now installed in a housing 18 with a cavity milled therein so that section 12 moves only along in the Y-axis direction, then the sections 13 and 14 will be pushed against one sliding shoulder and against the screws with the springs opposite the screws. The centerline screw-spring goes halfway through the 45° inclined faces of section 14 and section 13 for their maximum stability. The dimension a and b of the cavity in Part C have to be width and length of the combined slides B plus the dimension of total translation. This additional dimension for the total translation also determines the minimum width of the slots for splitting Part B along the x- and y-axis. The depth of the cavity is slightly less than the plate 10 on top of Part B. After alignment, the detector plate will be clamped with fastener screws through Part C to the optical housing at the exit of the optical path. By these means the detector housing 18 is held in place. On the IBAS sensor the housing 18 and the detector plate 10 are clamped and fixed with the bottom plate of a preamplifier housing.

I claim:

1. A planar translation device for alignment of one part relative to another comprising, in combination:

a mounting plate holder, an optical element mounted in said holder that requires alignment in one single plane to a fixed beam, an adjustable cradle means for cradling the mounting plate holder comprising a multi-section segment that is split into three sections, with a housing for moving the mounting plate by means of the adjustable cradle parts along both the x axis and y axis with projecting adjustment means that project through the wall of the housing.

2. The planar translation device of claim 1 wherein the multi-segment section is split along both the x and y axis.

3. A planar translation device for alignment of one part relative to another comprising, in combination:

a mounting plate holder with an optical element mounted in the said holder that requires alignment to a fixed part, a three piece cradle means designed to cradle the mounting plate holder, wherein the cradle has an interior flat base wall with inclined end walls raised at an angle to the said base wall each end wall inclined at a suitable angle to fit continguously around a corresponding wall of the holder element.

4. The planar translator of claim 3 wherein the inclined end walls of the cradle are inclined at 45° to the flat base wall.

5. The planar translator of claim 4 wherein two end walls of the mounting plate holder are inclined, each at a 45° angle.

* * * * *